United States Patent [19]
Fukushima et al.

[11] Patent Number: 4,608,784
[45] Date of Patent: Sep. 2, 1986

[54] WORK SPINDLE DEVICE

[75] Inventors: Matsuhiro Fukushima; Hitoshi Kaifu; Yoshinori Oyobiki, all of Saitama, Japan

[73] Assignee: Honda Giken Kogyo Kabushiki Kaisha, Tokyo, Japan

[21] Appl. No.: 679,269

[22] Filed: Dec. 7, 1984

[30] Foreign Application Priority Data

Dec. 12, 1983 [JP] Japan ............................ 58-191888[U]

[51] Int. Cl.$^4$ .............................................. B25B 5/00
[52] U.S. Cl. .............................. 51/237 R; 51/105 VG; 51/237 M; 51/237 T
[58] Field of Search ............ 51/237 R, 237 M, 237 T, 51/105 VG

[56] References Cited

U.S. PATENT DOCUMENTS

| | | | |
|---|---|---|---|
| 291,235 | 1/1884 | Sibley | 51/237 R |
| 1,978,315 | 10/1934 | Lemay | 51/105 VG |
| 2,569,093 | 9/1951 | Drissner | 51/105 VG |
| 4,520,595 | 6/1985 | Diener | 51/237 T |

Primary Examiner—Frederick R. Schmidt
Assistant Examiner—J. T. Zatarga
Attorney, Agent, or Firm—Irving M. Weiner; Joseph P. Carrier; John J. Cantarella

[57] ABSTRACT

A work spindle device having a rotor which allows a workpiece to be fed and ejected quickly and permits the workpiece to be machined simultaneously at opposite ends thereof. A clamp member having collets on opposite ends and a central axial through hole for insertion of the workpiece therein is disposed in the rotor. Each of the collets is insertable in one of a pair of tapered holes defined in the rotor so as to be pitted therein. A spring means normally urges the collets and the corresponding tapered holes into interfitting engagement for clamping the workpiece in the rotor. The work spindle device also has a mechanism for releasing the collets and the tapered holes from their interfitting engagement to unclamp the workpiece from the rotor.

4 Claims, 6 Drawing Figures

WORK SPINDLE DEVICE

BACKGROUND OF THE INVENTION

1. Field of the Invention

The present invention relates to a machine tool, and more particularly to a work spindle device for holding and rotating a workpiece.

2. Description of the Prior Art

Rod-shaped parts having machined opposite ends are found on many machines and apparatus. In particular, parts having the profile of a revolving body are required to be clamped and rotated by a work spindle device when they are to be machined. Heretofore, it has been time-consuming to clamp and unclamp such parts. At times, the time required for feeding a workpiece into and ejecting the same from the work spindle device is longer than the time required for machining the workpiece. This is disadvantageous in that the overall machining efficiency and hence the rate of production of parts or workpieces is low.

SUMMARY OF THE INVENTION

The present invention eliminates the foregoing drawbacks.

It is an object of the present invention to provide a work spindle device which allows a workpiece to be fed therein and ejected therefrom quickly and accurately.

Another object of the present invention is to provide a work spindle device which permits a workpiece to be machined simultaneously at opposite ends thereof, reduces the required frequency of feeding and ejecting workpieces to half an extent of the conventional feeding and ejecting frequency, thus shortening the machining time and achieving a high rate of production.

Still another object of the present invention is to provide a work spindle device particularly suitable for simultaneous machining of opposite ends of relatively small-sized, substantially rod-shaped workpieces such as, for example, intake and exhaust valves for use in internal combustion engines.

A still further object of the present invention is to provide a work spindle device which can easily be automatized through combination with a work feeder device.

The work spindle device of the present invention allows a machined workpiece to be ejected and a new workpiece to be fed and set in position while at least one workpiece is being machined. Therefore, workpieces can simultaneously be machined, ejected, and fed in successive cycles to thereby shorten the time required for a single operation cycle. A machine installation space can be effectively utilized by the work spindle device of the invention. Rotors for holding workpieces can independently be driven and stopped, and a jig body carrying the rotors can be indexed through angular intervals dependent on the number of rotors employed.

According to the present invention, a work spindle device comprises a rotor having a central hollow and a pair of tapered holes each having an axis aligned with an axis of rotation of the rotor, means for supporting the rotor rotatably and driving the rotor, and a clamp member having a pair of collets on respective ends thereof and a central axial through hole for insertion of a workpiece therein, each of the collets being insertable in one of the tapered holes so as to be fitted therein. The work spindle device also includes a spring means for normally urging the collets and the tapered holes to fit respectively with each other so as to clamp the workpiece in the rotor, and means for releasing fitting engagement between the collets and the tapered holes to unclamp the workpiece from the rotor.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
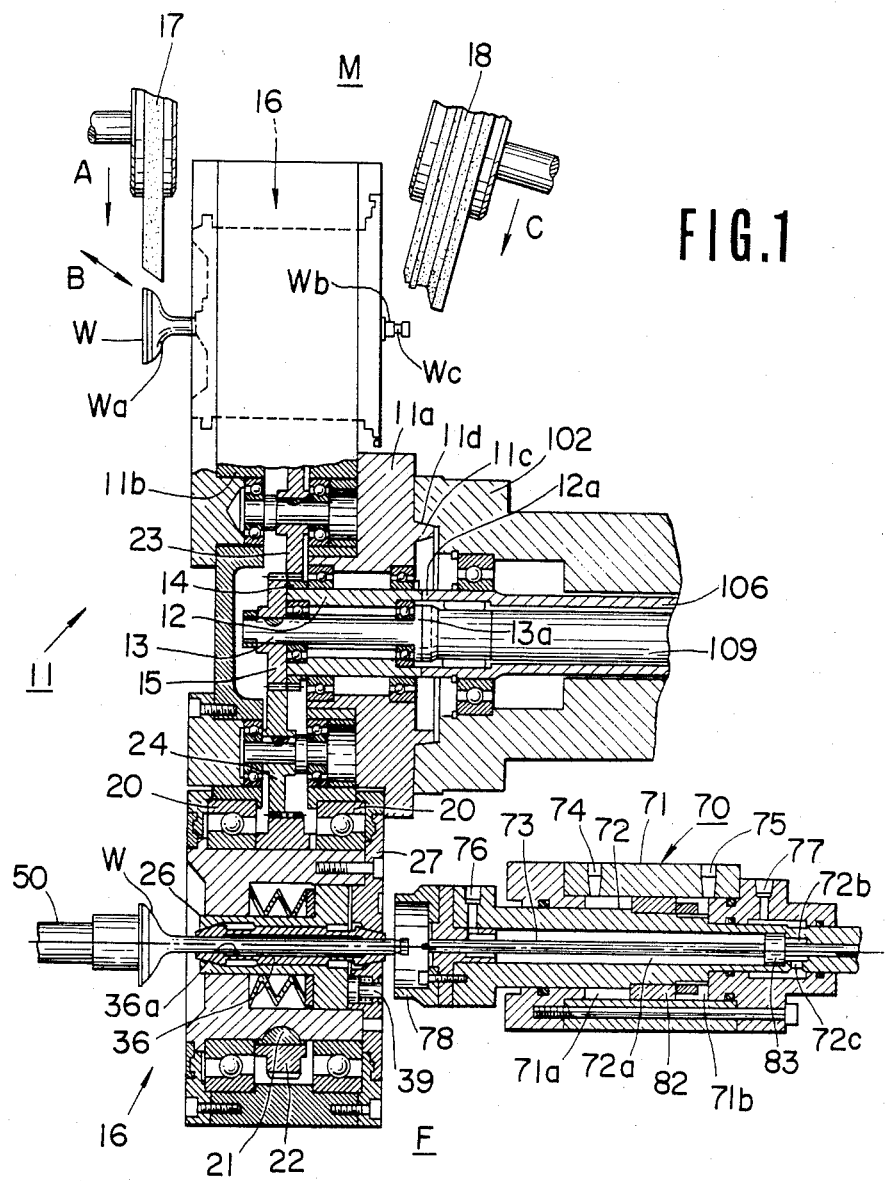
FIG. 1 is a fragmentary cross-sectional view of a work spindle device according to a first embodiment of the present invention, with a substantial portion of a drive device being omitted from illustration.
Figure 2:
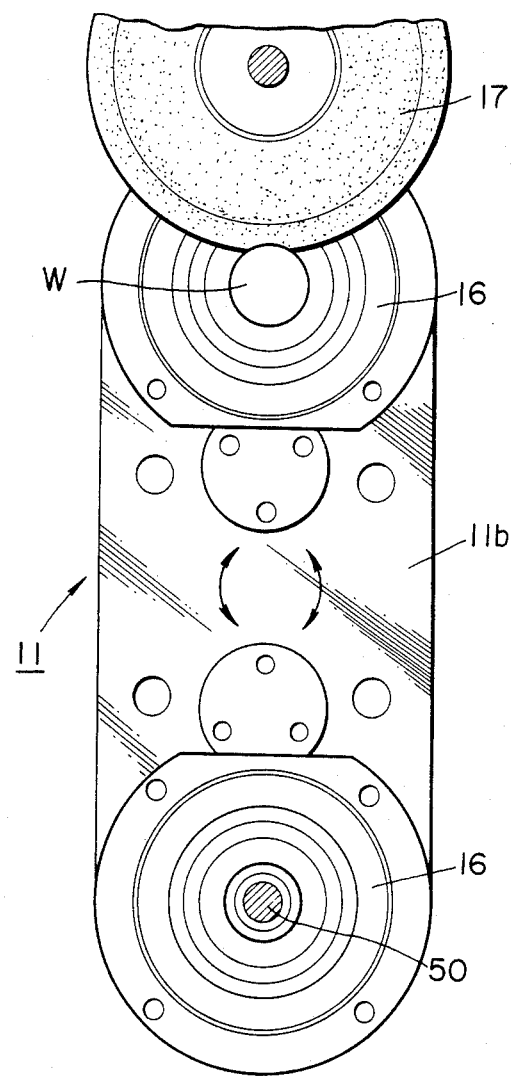
FIG. 2 is a front elevational view of a jig in the work spindle device showing FIG. 1, the view also showin a grinding wheel.

A work spindle device shown in FIG. 1 according to an embodiment of the present invention is suitable for use on a grinding machine for simultaneously grinding the opposite ends of an engine valve, the work spindle device having two rotors. The present invention can, however, be embodied in a work spindle device for use on a machine tool other than the grinding machine. The number of rotors in the work spindle device of the invention is selectable dependent on the type of a machine tool on which the work spindle device is mounted.

The work spindle device generally comprises a drive device 100 (FIG. 4) having an indexing barrel 102, a jig body 11 (FIG. 1) having a barrel 11a detachably coupled to the indexing barrel 102, and an ejector mechanism 70 for ejecting workpieces W from the jig body 11. The drive device 100 and the jig body 11 are separate from each other so that a desired one of different jig bodies designed for varying workpiece sizes can be selected and used with the drive device 100. Therefore, the work spindle device lends itself to machining different workpieces in small quantities. For the mass production of workpieces of equal dimensions, the drive device 100 and the jig body 11 may be combined with each other in a single integral construction.

The barrel 11a of the jig body 11 is of a hollow construction in which thre is rotatably supported a first hollow drive shaft 12 in which a second solid drive shaft 13 is rotatably supported. The first and second drive shafts 12, 13 have front ends (lefthand ends as shown in FIG. 1) on which gears 14, 15 are mounted, respectively. The barrel 11a and the first and second drive shafts 12, 13 are concentrically arranged and have rear ends provided with a coupling construction for being coupled with the indexing barrel 102 and first and second spindles 106, 109 in the drive device 100.

A rotor support 11b with rotors 16 mounted on opposite ends thereof is fixed to an end of the barrel 11a. The rotor support 11b is swingable in response to angular movement of the barrel 11a to move each of the rotors 16 between a feeding/ejecting position F and a machining position M.

A wheel spindle mechanism (not shown) is disposed in a position adjacent to the rotor located in the machining position M. The wheel spindle mechanism has grinding wheels 17, 18 which are movable axially and radially. The ejector mechanism 70 is disposed in a position adjacent to the rotor located in the feeding/ejecting position F for ejecting workpieces W from the rotors 16.

Each of the rotors 16 is rotatably supported by bearings 20 in the jig body 11. A gear 22 is concentrically fitted over each rotor 16 and secured thereto by a key 21. The gear 14 mounted on the first drive shaft 12 is operatively coupled by an idle gear 23 to the gear 22 on one of the rotors 16, while the gear 14 mounted on the second drive shaft 13 is operatively coupled by an idle gear 24 to the gear 22 on the other rotor 16. The rotors 16 are therefore independently rotatable by the first and second drive shafts 12, 13, respectively.

The two rotors 16 are of the same construction as described below.

Figure 3:
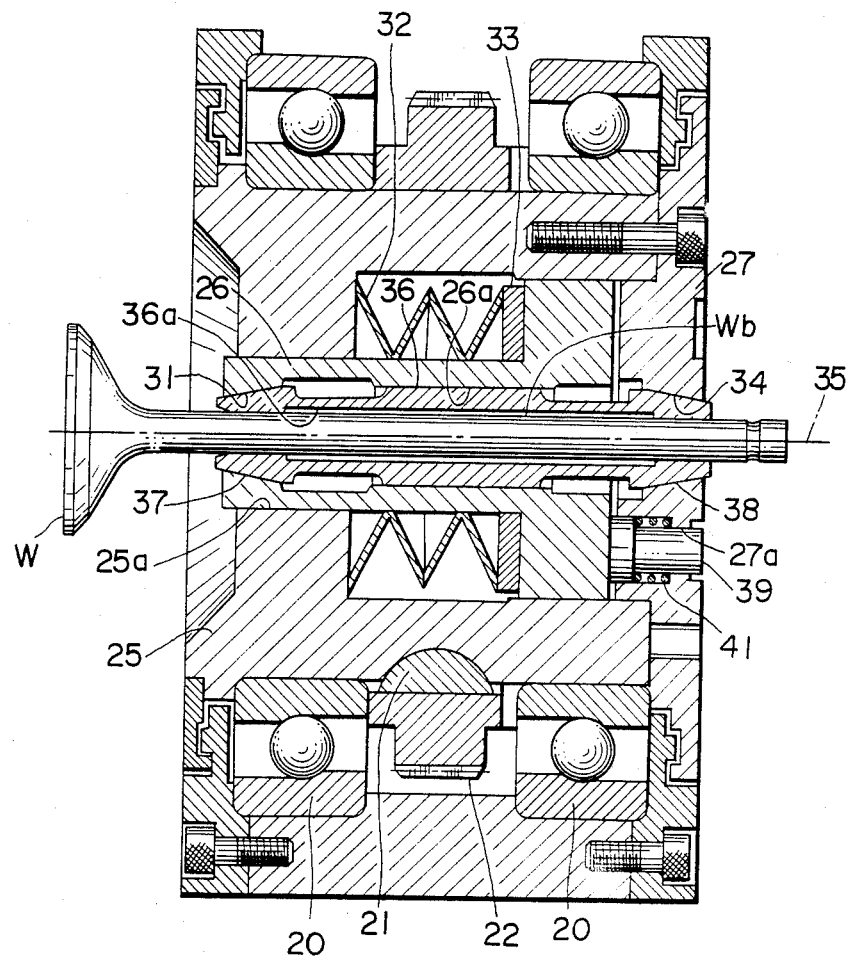
FIG. 3 is a cross-sectional view of a rotor in the device illustrated in FIG. 1, with a workpiece in the form of an engine valve being clamped in the rotor.

As illustrated in FIG. 3, each rotor has a casing body 25 in the form of a hollow cylinder having a bottom wall on a front end (lefthand end as shown), a movable casing 26 fitted axially slidably in the cylindrical casing body 25, and an end cover 27 fastened to an open rear end of the cylindrical casing body 25 by means of bolts to close the open rear end. The bearings 20 and the gear 22 are fitted over the cylindrical wall of the casing body 25, the gear 22 being positioned axially between the bearings 20. The bottom wall of the casing body 25 has a central axial guide hole 25a defined therein and having an axis aligned with an axis of rotation 35 of the rotor 16.

The movable casing 26 has a hollow cylindrical shape having on a rear end thereof (righthand end as shown) a flange having an outer peripheral surface held in sliding contact with a cylindrical inner wall surface of the casing body 25, and also having a central axial hole 26a. The axial hole 26a includes a first tapered hole 31 which is located at a front end thereof and in which the diameter thereof is progressively smaller toward the front end thereof. The movable casing 26 has a front end axially slidably inserted in the guide hole 25a in the bottom wall of the casing body 25. Between a front surface of the flange of the movable casing 26 and an inner or rear surface of the bottom wall of the casing body 25, there is disposed a spring assembly 32 composed of a stack of belleville springs and a washer-shaped shim 33.

The end cover 27 has a second tapered hole 34 defined centrally therein and having a diameter progressively reduced toward a rear end thereof. The first tapered hole 21 in the movable casing 26 and the second tapered hole 34 in the end cover 27 have axes aligned with the axis 35 of rotation of the rotor 16, and are tapered away from each other. The spring assembly 32 normally urges the movable casing 26 rearwardly to reduce the distance between the first and second tapered taper holes 31, 34.

A clamp member 36 having collets 37, 38 on its opposite ends is inserted through the axial hole 26a in the movable casing 26, and has an axial through hole 36a defined centrally therein for insertion therein of the workpiece W. The collets 37, 38 are of the push-out type and are insertable in the first and second tapered holes 31, 34, respectively, so as to be fitted therein. The spring assembly 32 normally urges the collets 37, 38 to be fitted respectively in the first and second tapered holes 31, 34 for thereby clamping the workpiece W inserted through the clamp member 36 in the rotor 16.

The end cover 27 has an off-center axial guide hole 27a in which a push rod 39 is slidably fitted. The push rod 39 is normally urged by a coil spring 41 disposed in the guide hole 27a to force a front end thereof against a rear end of the flange of the movable casing 26. The push rod 39 has a rear end projecting out of the rotor 16 through a rear surface of the end cover 27. The push rod 39 will cooperate with the ejector mechanism 70 in releasing the collets 37, 38 out of fitting engagement in the tapered holes 31, 34 to unclamp the workpiece W from the rotor 16.

As shown in FIG. 1, the ejector mechanism 70 comprises a double-walled cylinder comprising an outer tube 71, an inner tube 72 slidably disposed in the outer tube 71, and an ejector rod 73 slidably disposed in the inner tube 72. The ejector mechanism 70 has central axis aligned with the axis of the rotor 16 located in the feeding/ejecting position F. The inner tube 72 is slidably fitted in the outer tube 71 with a piston 82 interposed therebetween, and the ejector rod 73 is slidably fitted in the inner tube 72 with a piston 83 interposed therebetween. Chambers 71a, 71b defined by the piston 82 in the outer tube 71 are held in communiation with ports 74, 75, respectively, defined in the outer tube 71. Furthermore, chambers 72a, 72b are defined by the piston 83 in the inner tube 72. The front chamber 72a communicates with a port 76 defined in a front portion of the inner tube 72, while the rear chamber 72b communicates with a port 77 defined in a rear portion of the outer tube 71 through a passage 72c defined in a rear portion of the inner tube 72. The ejector rod 73 has a front end projecting forwardly out of the inner tube 72 for pushing the rear end of the workpiece W to eject the same out of the rotor 16. A cylindrical push member 78 is secured by a bolt to a front end surface of the inner tube 72 and has an annular front end surface disposed in confronting relation to a rear end surface of the push rod 39 projecting from the rear end surface of the rotor 16. When the ejector mechanism 70 is inoperative, the ejector rod 73 and the push member 78 are spaced respectively from the rear end of the workpiece W and the rear end of the push rod 39.

The jig body 11 is rotatably supported on and indexed by the drive device 100, and the two rotors 16 supported in the jig body 11 are independently driven by the drive device 100. The drive device 100 will now be described in detail with reference to FIG. 4.

The drive device 100 includes a casing 101 in which the hollow indexing barrel 102 is rotatably supported by two front annular roller bearings 103, 104 and a rear needle bearing 105. The first hollow spindle 106 is rotatably and concentrically disposed in the indexing barrel 102 and supported therein by a front ball bearing 107 and a rear needle bearing 108. The second spindle 109 is rotatably and concentrically disposed in the first spindle 106 and supported therein by a front needle bearing 111 and a rear ball bearing 112.

The second spindle 109 has a rear end projecting out of the first spindle 106 and to which a pulley 113 is fixed by a key 114. The pulley 113 is locked against axial movement by a lock nut 116 fastened to the rear end of the second spindle 109 with a washer 115 held between the lock nut 116 and the pulley 113. The first spindle 106 has a rear end projecting out of the indexing barrel 102 and to which a pulley 117 is secured by bolts 118. The ball bearing 112 is interposed between the inner periphery of the pulley 117 and the first spindle 109. The pulleys 113, 117 are operatively coupled to respective motors (not shown) by means of endless belts 122, 121, respectively. Therefore, the first and second spindles 106, 109 can be driven independently of each other.

Figure 4:
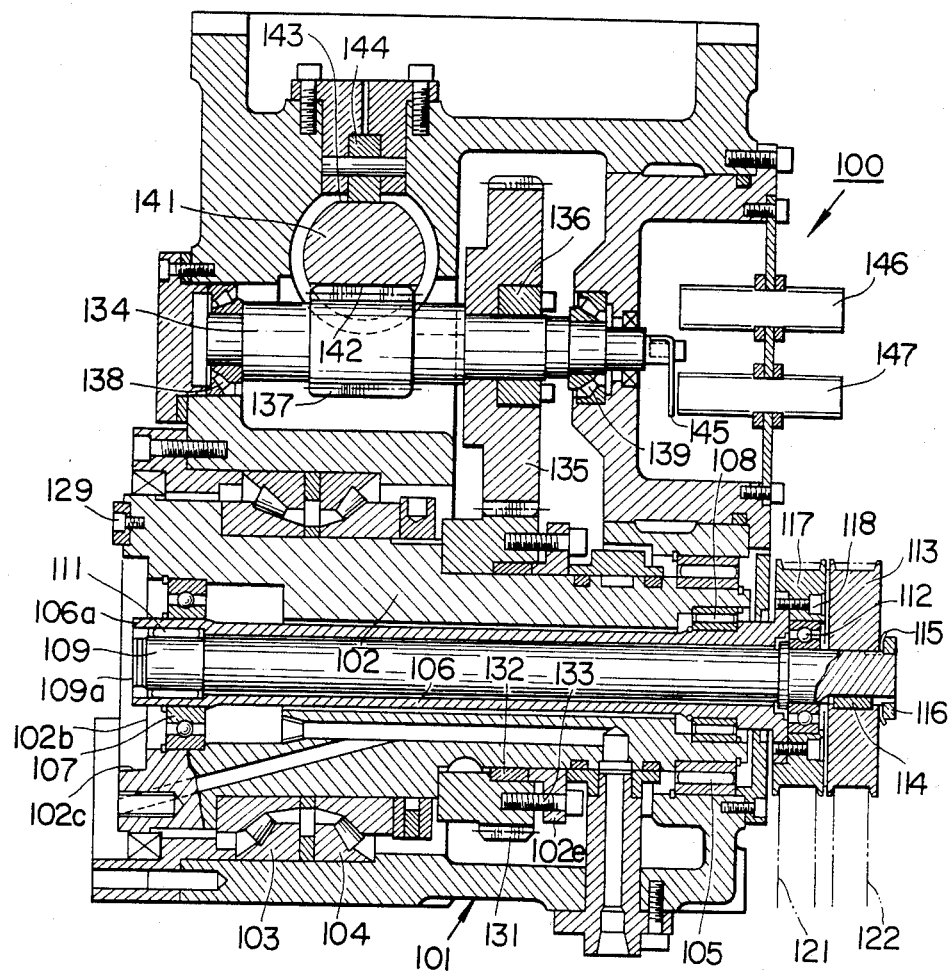
FIG. 4 is a cross-sectional view of the drive device in the work spindle device of FIG. 1.

The indexing barrel 102 has a mechanism for turning the indexing barrel through a prescribed angle, that is, for indexing the indexing barrel. More specifically, as shown in FIG. 4, a gear 131 is fixed to an intermediate outer peripheral surface of the indexing barrel 102 by means of a key 132 and bolts 133 connected to a flange 102e secured to the indexing barrel 102. The gear 131 is held in mesh with a gear 135 fixed by a key 136 to an output shaft 134 near a rear end thereof, which is disposed in the casing 101 parallel to the indexing barrel 102. The output shaft 134 is rotatably supported in the casing 101 by means of front and rear roller bearings 138, 139. The output shaft 134 has a gear 137 defined thereon near a front end thereof and held in mesh with teeth 142 on a rack shaft 141 slidably extending transversely in the casing 101. The rack shaft 141 has a flat back 143 engaging a cam roller 144 rotatably supported in the casing 101. A proximity dog 145 is secured to the rear end of the output shaft 134 and positioned in slightly spaced relation to the front ends of two proximity switches 146, 147 disposed in a rear portion of the casing 101 in 180°-spaced relation to each other.

The rack shaft 141 is longitudinally driven by a hydraulic system (not shown) which is of a known electrically controllable construction. Such hydraulic system may be replaced with a mechanical system including a motor. The proximity switches 146, 147 are switches which can be closed when the dog 145 is located within a certain range therefrom, the proximity switches 146, 147 being electrically connected to a controller (not shown) for the hydraulic system.

The gear 135 fixed to the output shaft 134 and the gear 131 fixed to the indexing barrel 102 and meshing therewith have equal numbers of teeth. Therefore, indexed rotation through 180° of the indexing barrel 102 is controlled by the proximity switches 146, 147 actuated by the proximity dog 145 angularly moved by rotation of the output shaft 134 which is caused by rectilinear motion of the rack shaft 141, so that the jig body 11 attached to the indexing barrel 102 will be rotated in one direction and the other.

The indexing barrel 102 and the first and second spindles 106, 109 have on their front ends a coupling construction for being coupled to the barrel 11a and the first and second drive shafts 12, 13 in the jig body 11.

The coupling constructions in the drive device 100 and the jig body will hereinafter be described in greater detail with reference to FIGS. 1 and 4.

The rear end of the barrel 11a in the jig body 11 has an annular ridge 11c including an outer peripheral male tapered surface 11d. The front end of the indexing barrel 102 of the drive device 100 has a circular recess 102b defined by an inner peripheral female tapered surface 102c engageable with the male tapered surface 11d of the annular ridge 11c. The first and second spindles 106, 109 have front ends projecting into the circular recess 102b and including couplings 106a, 109a, respectively. The coupling 109a of the second spindle 109 has a flange. The first and second drive shafts 12, 13 in the jig body 11 have rear ends including respective couplings 12a, 13a, the coupling 13a having a flange. These couplings are constructed for meshing engagement with each other.

For attaching the jig body 11 to the drive device 100, the annular ridge 11c on the rear end of the barrel 11a in the jig body 11 is fitted in the circular recess 102b in the front end of the indexing barrel 102 in the drive device 100, the barrels 11a, 102 being accurately centered with respect to each other by engagement of the tapered surfaces 11d, 102c. Thereafter, the barrels 11a, 102 are fixed to each other by means of bolts. After the jig body 11 has been attached to the drive device 100, the coupling 106a of the first spindle 106 meshes with the coupling 12a of the first drive shaft 12, and the coupling 109a of the second spindle 109 meshes with the coupling 13a of the second drive shaft 13.

Therefore, the couplings which mesh with each other are corotatable with each other, and the two rotors 16 in the jig body 11 are controlled to rotate by the respective drive systems. The jig body 11 is indexed by the indexing barrel 102.

In the foregoing embodiment, the work spindle device is incorporated in an automatic grinding machine in which the workpiece W or engine valve is supported at its opposite ends and is angularly moved, and a valve face Wa at a front end of the engine valve W and a rear end of a stem Wb including a cotter slot Wc can be ground simultaneously. The automatic grinding machine includes, other than the work spindle device, a wheel spindle device for driving and operating the grinding wheels, and a work feeder device for supplying workpieces to the work spindle device.

As described hereinabove, the wheel spindle device has the two grinding wheels 17, 18. The grinding wheel 17 is disposed forwardly of the rotor 16 located in the machining position M, and has a peripheral tapered surface extending at 45° with respect to the axis of the engine valve W clamped in the rotor 16. In operation, the grinding wheel 17 as it is rotated moves toward the valve W in a direction normal to the axis of the valve W as indicated by the arrow A, and then grinds the valve face Wa while oscillating back and forth in a direction at 45° to the axis of the valve W as indicated by the arrow B, thus reducing the surface roughness of the valve face Wa. The grinding wheel 18 is located behind the rotor 16 located in the machining position M for simultaneously grinding the cotter slot Wc in the stem Wb of the engine valve W and the rear end portion thereof including the rear end face. The grinding wheel 18 has a peripheral surface formed in complementary relation to the rear end portion of the engine valve W. In operation, the grinding wheel 18 rotates and moves toward the rear end portion of the valve stem Wb in a direction at an angle to the valve axis as indicated by the arrow C, and then simultaneously grinds the rear end face and outer peripheral surface of the stem Wb and the cotter slot Wc. The approaching movement of the grinding wheel 18 at an angle to the valve axis is effective in increasing the service life of the grinding wheel 18.

The work feeder device includes a known work transfer device (not shown) and a reciprocable feeder rod 50 (only a distal end thereof being shown in FIG. 1). The feeder rod 50 is disposed coaxially with the ejector mechanism 70 and remotely therefrom with the jig body 11 positioned therebetween. The work transfer device serves to transfer the engine valve W into a position between the feeder rod 50 and the rotor 16 as it is in the feeding/ejecting position F while aligning the axis of the engine valve W with the axis of the rotor 16, that is, the central through hole 36a in the clamp member 36.

Operation of the automatic grinding machine for machining the engine valve W will now be described. When one of the rotors 16 in the jig body 11 is in the machining position M, the other rotor 16 is in the feeding/ejecting position F. While the rotors 16 are moved from the machining position M to the feeding/ejecting position F upon angular movement of the jig body 11, the rotors 16 are stopped in their rotation about their own axes. When the rotor 16 reaches the feeding/ejecting position F, a fluid under pressure is supplied through the port 75 into the rear chamber 71b in the outer tube 71 in the ejector mechanism 70 to cause the piston 82 to move the inner tube 72 forwardly. The cylindrical push member 78 fixed to the front end of the inner tube 72 now pushes the push rod 39 on the end cover 27 to displace the movable casing 26 into the casing body 25 against the resilient force of the spring assembly 32. The collets 37, 38 of the clamp member 36 are now brought out of fitting engagement in the first tapered hole 31 in the movable casing 26 and the second tapered hole 34 in the end cover 27, whereupon the collets 37, 38 are opened. Then, an engine valve W is placed between the retracted feeder rod 50 and the rotor 16 by means of a transfer mechanism, and the feeder rod 50 is advanced to insert the stem Wb of the engine valve W into the clamp member 36 in the rotor 16. The feeder rod 50 is then stopped, and the ejector rod 73 in the ejector mechanism 70 aligned with the feeder rod 50 is advanced so that the engine valve W is held in position by and between the feeder rod 50 and the ejector rod 73. The ejector rod 50 is stopped in an accurately defined position, and should be held in such a position against any unwanted displacement which would be caused by the ejector rod 73 as it pushes the engine valve W. The pushing force of the ejector rod 73 should be strong enough to keep the distal end of the feeder rod 50 in complete contact with the front end of the engine valve W.

After the engine valve W has been positioned, the inner tube 72 in the ejector mechanism 70 is retracted to space the push member 78 from the push rod 39. Since the movable casing 26 is resiliently biased toward the end cover 27 under the resilient forces of the belleville springs 32, the movable casing 26 is moved toward the end cover 27 while pushing the push rod 39 upon disengagement of the push member 78 from the push rod 39. The first tapered hole 31 in the movable casing 26 now fits over the front collet 37 of the clamp member 36. Then, the clamp member 36 is moved with the movable casing 26 to cause the rear collet 38 to fit into the second tapered hole 34 in the end cover 27. The collets 37, 38 as they fit into the respective tapered holes 31, 34 are contracted radially inwardly to clamp the ends of the stem Wb of the engine valve W.

After the engine valve stem Wb has been clamped, the ejector rod 73 is retracted and the indexing barrel 102 is turned to bring the rotor 16 in which the engine valve W is clamped to the machining position M having the grinding wheels 17, 18. While the jig body 11 is being thus indexed, the rotor 16 starts rotating. Therefore, the engine valve W is ground at its opposite ends by the griding wheels 17, 18 while the engine valve W is in rotation.

After completion of the grinding operation, the jig body 11 is indexed again to return the rotor 16 back to the feeding/ejecting position F in which the ground engine valve W is ejected from the rotor 16. More specifically, the inner tube 72 in the ejector mechanism 70 is advanced to cause the push member 78 to push in the push rod 89 for thereby moving the movable casing 26 forwardly. The collets 37, 38 of the clamp member 36 are released out of fitting engagement in the tapered holes 31, 34 and hence are opened to unclamp the engine valve W. Then, the ejector rod 73 is advanced to have the front end thereof push the rear end of the stem Wb of the engine valve W. With continued advancing movement of the ejector rod 73, it inserts itself into the clamp member 36 to eject the engine valve W forwardly out of the rotor 16.

The ejection of the ground engine valve W is followed by feeding a new workpiece to be ground next in the manner described above. While one of the rotors 16 is in the machining position M for grinding the workpiece, the ground workpiece is ejected from and a new workpiece is fed into the other rotor in the feed/ejecting position F. Therefore, the grinding operation is effected efficiently in successive cycles.

A work spindle device according to a second embodiment of the present invention will be described hereinbelow. The second embodiment differs from the first embodiment as to (1) the arrangemeent of the rotors and the clamp mechanism and (2) the mechanism for indexing the indexing barrel in the drive device. Since the other components of the second embodiment are the same as those of the first embodiment, they will not be described in detail.

Figure 5:
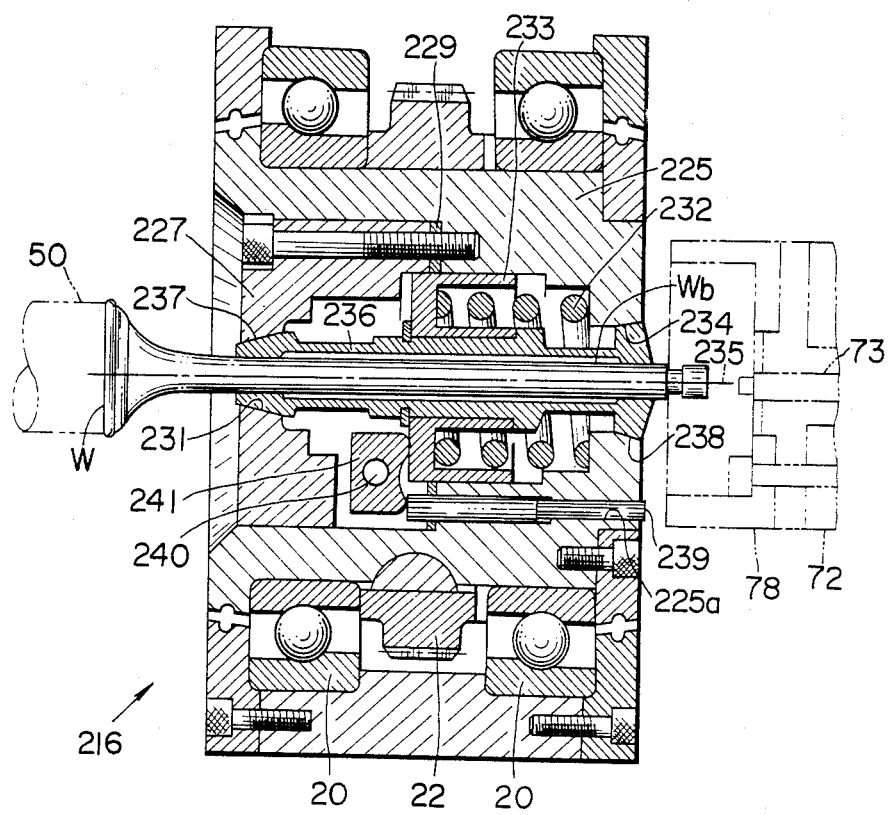
FIG. 5 is a cross-sectional view of a rotor in a work spindle device according to a second embodiment, the view showing a workpiece in the form of an engine valve as being clamped in the rotor.
Figure 6:
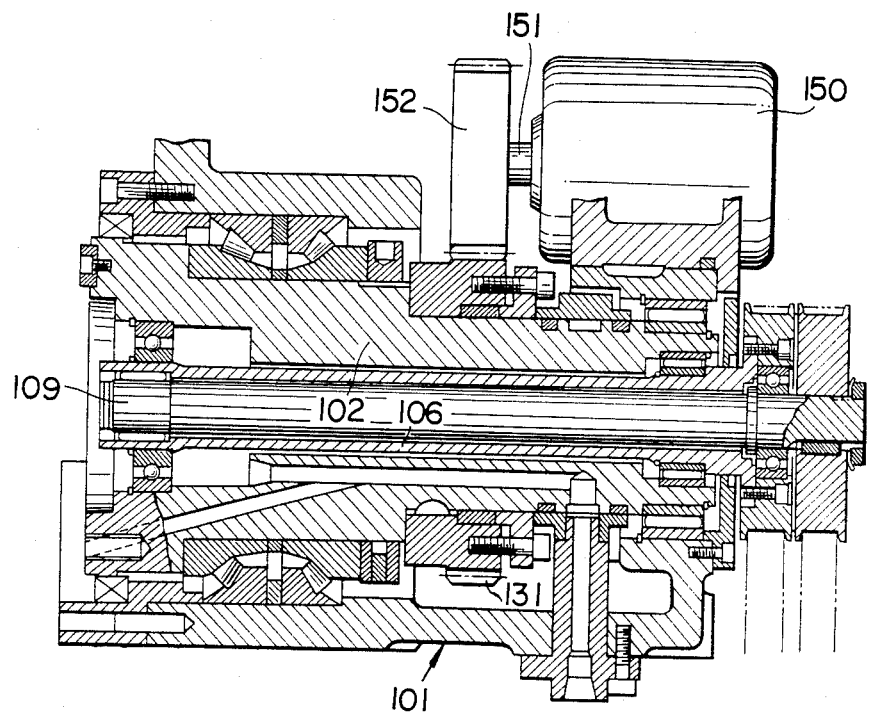
FIG. 6 is a cross-sectional view of an indexing mechanism in a drive device in a work spindle device according to a second embodiment of the present invention.

As shown in FIG. 5, a rotor 216 comprises a casing body 225 in the form of a hollow cylinder having a bottom wall at a rear end (righthand end as shown) thereof, and a housing member 227 in the form of a hollow cylinder fitted in a front portion of the casing body 225 and having a bottom wall at a front end (lefthand end as shown). The casing body 225 and the housing member 227 are secured to each other by bolts through an annular shim 229 interposed between the front surface of a shoulder defined on an inner peripheral surface of the casing body 225 and positioned substantially centrally in the axial direction thereof and a rear end surface of the housing member 227. The bearings 20 and the gear 22 are fitted over the casing body 225.

The front bottom wall of the housing member 227 has a first tapered hole 231 defined centrally therein, and the rear bottom wall of the casing body 225 has a second tapered hole 234 defined centrally therein. The first and second tapered holes 231, 234 have central axes aligned with an axis of rotation 235 of the rotor 216, and have diameters which are progressively reduced in the forward direction.

The casing body 225 and the housing member 227 jointly define a central hollow in the rotor 216, and a clamp member 236, and a spring mechanism and a link mechanism for clamping and unclamping a workpiece on and from the clamp member 236 are disposed in the central hollow. The clamp member 236 is constructed for inserting a stem Wb of a workpiece W therein, and has an intermediate cylindrical portion and front and rear collets 237, 238. The collets 237, 238 have outer tapered surfaces having diameters progressively reduced in the forward direction (to the left as shown). Thus, the front collet 237 comprises a push-out type collet, and the rear collet 238 comprises a draw-back type collet. The front and rear collets 237, 238 are insertable respectively into the first and second tapered holes 231, 234 so as to be fitted therein. The distance between the first and second tapered holes 231, 234 can be slightly adjusted by grinding the shim 229 to reduce the thickness thereof, so that the front and rear collets 237, 238 will fit simultaneously into the first and second tapered holes 231, 234, respectively, in the rotor 216.

A spring seat 233 is axially immovably fitted over the intermediate cylindrical portion of the clamp member 236 and positioned axially between a flange of the cylindrical portion and a snap ring fitted thereover. A coil spring 232 is disposed under compression between an inner surface of the rear bottom wall of the casing body 235 and the spring seat 233 for normally urging the clamp member 236 to move in the forward direction to actuate the collets 237, 238.

A pivot pin 240 is disposed in the central hollow in the rotor 216 and has an axis normal to the engine valve W to be machined. A rectangular push lever 241 is swingably supported at its center on the pivot pin 240. The rectangular push lever 241 has a rear end surface including an edge (at an upper end as shown) held against a front end of the spring seat 233 on the clamp member 236.

The casing body 225 has an axial through hole 225a including a front portion of a relatively large diameter and a rear portion of a relatively small diameter. The through hole 225a has front and rear ends opening respectively at the shoulder in the casing body 225 and a rear end thereof. In the through hole 225a, there is inserted a push rod 239 having a front portion of a relatively large diameter and a rear portion of a relatively small diameter. The push rod 239 is limited in its backward movement by engagement between a rear end of the large-diameter portion of the push rod 239 and a front end of the small-diameter portion of the through hole 225a. The push rod 239 has a front end held against an edge (at a lower end as shown) of the rear end surface of the rectangular level 241, and a rear end normally projecting rearwardly from a rear end of the rotor 216.

The rotor 216 of the second embodiment is assembled in a jig body having the same construction as that of the jig body of the first embodiment under the same condition as the first embodiment. An ejector mechanism for feeding and ejecting a workpiece into and from the rotor 216 is of the same construction as that of the first embodiment, the ejector mechanism being shown by the imaginary lines in FIG. 5.

In feeding and ejecting the workpiece, the cylindrical push member 78 fixed to the front end of the inner tube 72 pushes the rear end of the push rod 239 projecting from the rear end of the rotor 216 to move the push rod 239 in the forward direction. The forward movement of the push rod 239 causes the rectangular push level 241 to turn clockwise in FIG. 5 about the pivot pin 240 for thereby retracting the spring seat 233 against the force of the coil spring 232. The clamp member 236 is now retracted in the rotor 216 to bring the front and rear collets 237, 238 of the clamp member 236 out of fitting engagement in the first and second tapered holes 231, 234, whereupon the collets 237, 238 are opened or unclamped.

After a workpiece W has been inserted in the clamp member 236, the inner tube 72 of the ejector mechanism is retracted to space the cylindrical push member 78 from the push rod 239. The clamp member 236 is now released of the force tending to move the same forwardly against the force of the coil spring 232, thus allowing the link mechanism comprising of the push rod 239 and the push lever 241 to return to the original position under the force of the coil spring 232. At the same time, the clamp member 236 is advanced again under the resiliency of the coil spring 232 to permit the front and rear collet 237, 238 to fit into the respective first and second tapered holes 231, 234, whereupon the stem Wb of the engine valve or workpiece W is clamped and held reliably in position.

While in the first embodiment the jig body 11 is indexed by the rack shaft 141 in the drive device 100, the work spindle device of the second embodiment employs an indexing mechanism comprising a servomotor 150 having an output shaft 151 supporting a gear 152 held in direct mesh with a gear 131 fixedly mounted on the indexing barrel 102 in the drive device 100. The servomotor 150 is controlled by a controller (not shown) of a known arrangement.

In the above two embodiments, two rotors are mounted on the jig body. However, the number of rotors on the jig body may be varied dependent on the process of machining a workpiece. For example, for machining one end of a workpiece in two steps, three angularly spaced rotor positions may be provided, such as a first machining position for the first machining step, a second machining position for the second machining step, and a feeding/ejecting position, and three rotors may be mounted on the jig body and arranged radially with respect to an axis of rotation of the jig body in angularly equally spaced relation so that the rotors will be located respectively in the three positions. With such an alternative, there should be as many drive shafts in the jig body and as many spindles in the drive device which are to be coupled to the drive shafts for corotation as there are rotors.

The power transmission mechanism for operatively coupling the rotors and the drive shafts may comprise a belt and pulley mechanism or a chain and sprocket mechanism, rather than the illustrated gear mechanism.

The mechanism for indexing the jig body may be any known indexing mechanism.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A work spindle device for a machine tool, comprising:
   a rotor having a central hollow and a pair of tapered holes each having an axis aligned with an axis of rotation of said rotor;
   means for rotatably supporting and driving said rotor;
   a clamp member having a pair of collets on respective ends thereof and a central axial through hole for insertion of a workpiece therein, each of said collets being insertable in one of said tapered holes so as to be fitted therein;

spring means for normally urging said collets and said tapered holes to fit respectively with each other so as to clamp said workpiece in said rotor; and means for releasing fitting engagement between said collets and said tapered holes to unclamp said workpiece from said rotor;

said collets are push-out type collets;

said rotor comprises a hollow casing body, an end cover fixed to said casing body, and a movable casing fitted slidably in said casing body;

one of said tapered holes is defined in said end cover, and the other of said tapered holes is defined in said movable casing; and said spring means serves to shorten the distance between said tapered holes.

2. A work spindle device according to claim 1, wherein: said supporting and driving means comprises:

a rotatable jig body carrying thereon a plurality of said rotors, which are arranged radially with respect to an axis of rotation of said jig body in angularly equally spaced relation;

said jig body having a hollow barrel;

a plurality of drive shafts disposed in said barrel coaxially therewith, each of said drive shafts being interconnected with one of said rotors through a transmission mechanism;

means for driving said drive shafts independently of each other; and means for indexing said barrel of said jig body.

3. A work spindle device for a tool machine, comprising:

a rotor having a central hollow and a pair of tapered holes each having an axis aligned with an axis of rotation of said rotor;

means for rotatably supporting and driving said rotor;

a clamp member having a pair of collets on respective ends thereof and a central axial through hole for insertion of a workpiece therein, each of said collets being insertable in one of said tapered holes so as to be fitted therein;

spring means for normally urging said collets and said tapered holes to fit respectively with each other so as to clamp said workpiece in said rotor; and means for releasing fitting engagement between said collets and said tapered holes to unclamp said workpiece from said rotor;

one of said collets is a push-out type collet and the other of said collets is a draw-back type collet;

said rotor comprises a hollow casing body and a housing member fixed to said casing body;

one of said tapered holes is defined in said casing body and the other of said tapered holes is defined in said housing member; and said spring means is interposed between said clamp member and said rotor.

4. A work spindle device according to claim 3, wherein: said supporting and driving means comprises:

a rotatable jig body carrying thereon a plurality of said rotors, which are arranged radially with respect to an axis of rotation of said jig body in angularly equally spaced relation;

said jig body having a hollow barrel;

a plurality of drive shafts disposed in said barrel coaxially therewith, each of said drive shafts being interconnected with one of said rotors through a transmission mechanism;

means for driving said drive shafts independently of each other; and means for indexing said barrel of said jig body.

* * * * *

UNITED STATES PATENT AND TRADEMARK OFFICE
CERTIFICATE OF CORRECTION

PATENT NO. : 4,608,784

DATED : 9/2/86

INVENTOR(S) : Fukushima et al

It is certified that error appears in the above-identified patent and that said Letters Patent are hereby corrected as shown below:

Column 2, line 18 change "showing" to --shown in--; change "showin" to --showing--.

Column 3, line 23, change "14" to --15--.

Column 4, line 61, change "annular" to --angular--.

Column 5, line 61 after "body" insert --11--.

Column 8, line 4, correct the spelling of --grinding--;
line 27, change "feed/ejecting" to --feeding/ejecting--.

Column 9, line 62 change "level" to --lever--.

Abstract, line 8, change "pitted" to --fitted--.

Column 4, line 34, correct the spelling of --communication--.

Column 6, line 5, correct the spelling of --the--.

Column 8, line 33, correct the spelling of --arrangement--.

Signed and Sealed this

Tenth Day of February, 1987

*Attest:*

DONALD J. QUIGG

*Attesting Officer*    *Commissioner of Patents and Trademarks*